(12) United States Patent
Levionnais et al.

(10) Patent No.: US 8,761,667 B2
(45) Date of Patent: Jun. 24, 2014

(54) MOBILE TELEPHONE AND NFC COMMUNICATION

(75) Inventors: Philippe Levionnais, Caen (FR); David Picquenot, Authie (FR)

(73) Assignee: Orange, Paris (FR)

( * ) Notice: Subject to any disclaimer, the term of this patent is extended or adjusted under 35 U.S.C. 154(b) by 158 days.

(21) Appl. No.: 13/388,121

(22) PCT Filed: Jul. 21, 2010

(86) PCT No.: PCT/FR2010/051546
§ 371 (c)(1),
(2), (4) Date: Jan. 31, 2012

(87) PCT Pub. No.: WO2011/012797
PCT Pub. Date: Feb. 3, 2011

(65) Prior Publication Data
US 2012/0135682 A1  May 31, 2012

(30) Foreign Application Priority Data
Jul. 31, 2009  (FR) ..................... 09 55400

(51) Int. Cl.
*H04B 5/00* (2006.01)
(52) U.S. Cl.
USPC ........................................ 455/41.1
(58) Field of Classification Search
USPC ................ 455/41.1, 41.2, 575.7, 558, 552.1
See application file for complete search history.

(56) References Cited

FOREIGN PATENT DOCUMENTS

| DE | 10 2007 019 272 A1 | 10/2007 |
| EP | 1 569 165 A2 | 8/2005 |
| EP | 1 773 080 A2 | 4/2007 |
| KR | 20080113185 A | 12/2008 |

*Primary Examiner* — Eugene Yun
(74) *Attorney, Agent, or Firm* — Drinker Biddle & Reath LLP

(57) ABSTRACT

An electronic entity is adapted for a mobile terminal comprising a subscriber identity card. The electronic entity comprises a near-field communication component, an antenna for the near-field communication component and a wire interface that links the near-field communication component to the subscriber identity card, the near-field communication component being positioned at the level of the antenna.

9 Claims, 3 Drawing Sheets

MOBILE TELEPHONE AND NFC COMMUNICATION

CROSS-REFERENCE TO RELATED APPLICATIONS

This application is the U.S. national phase of the International Patent Application No. PCT/FR2010/051546 filed Jul. 21, 2010, which claims the benefit of French Application No. 09 55400 filed Jul. 31, 2009, the entire content of which is incorporated herein by reference.

FIELD OF THE INVENTION

The present invention relates to the field of contactless cards, and more particularly to the field of the use of mobile communications terminals as a contactless card.

BACKGROUND

A contactless card is based on an NFC ('Near Field Communication') type technology and allows different types of application, such as for example electronic transactions in the field of banking or also public transport, or even identity checking applications for access control. A contactless card is composed of a near-field communication component, hereinafter called NFC component, and an associated antenna which allows it to establish the contactless interface with a remote entity, which is an NFC device such as for example a terminal for electronic payment or a terminal for validating electronic transport tickets, or also an identification entity, depending on the applications under consideration.

The functionalities of such a contactless card can be provided by a mobile telephone terminal Conventionally, a mobile telephone terminal contains a 'Subscriber Identity Module', also called a SIM card. The SIM card comprises a chip with a microcontroller and memory. It is used for storing items of information specific to the subscriber of a mobile communication network.

When these mobile telephones can be used as a contactless card, they also comprise an NFC component and an associated antenna. Certain mobile telephone architectures thus allow cooperation between mobile telephone functionalities and NFC ('Near Field Communication') type functionalities.

FIG. 1 shows another, already envisaged, architecture of such a mobile telephone. This mobile telephone 10 comprises a microprocessor 11 linked to a SIM card 14 on which an NFC component 12 is implemented. More precisely, the SIM card incorporates, on the one hand, a contact interface for its conventional use and its functionalities directed towards mobile telephony and, on the other hand, a contactless interface implemented via an antenna 13 for the NFC type functionalities. Thus, the SIM card incorporates the NFC component required for near-field communications. In this case, in order to link the NFC component incorporated in the SIM card to the corresponding antenna 13, it is provided to establish a wired interface via a ribbon cable 21. In this architecture, the NFC component on the SIM card is remote from its antenna. Thus, the ribbon cable 21 makes it possible to route two antenna wires between two contacts of the SIM card 14 and the antenna 13, i.e. to extend the antenna 13 up to the NFC component, and thus to link the NFC component to the antenna corresponding to and used by it. The signals being carried are then analogue signals.

By proceeding in this manner, it is possible here to convert a simple mobile telephone into a mobile telephone with an NFC component by replacing a conventional SIM card with a SIM card incorporating an NFC component and by linking the latter to a detachable antenna 13. Moreover, both the SIM card, and therefore the NFC component, and the antenna are detachable and can therefore be kept, even when the mobile terminal is changed.

However, the antenna wires of the ribbon cable 21, which connect the antenna to the NFC component located at the level of the SIM card, are subject to the influence of several metallic masses which can be placed close to their location in the casing of the mobile terminal under consideration, as well as electronic components.

In such an architecture, therefore, it is not easy to ensure a certain level of quality, since the reliability of the wired interface connecting the antenna to the NFC component can be undermined as a function of the location of the antenna ribbon cable. This wired interface of antenna wires 21 can follow different paths between the NFC component and the antenna 13 for different mobile telephones which do not have the same casing shapes, but also for an identical mobile telephone, according to how this ribbon cable is placed inside its casing. Thus, depending on the more or less winding paths followed, different levels of quality can be obtained.

Moreover, since the signals being carried are analogue signals, it is advisable to determine a length of connecting wire adapted for an optimum operation of the NFC components. These lengths of connecting wire can be incompatible with the layout of certain mobile terminal casings. As a result, it can sometimes be difficult to transfer these NFC components intended to cooperate with SIM cards from one mobile terminal to another.

Moreover, this wired interface 21 is composed of a ribbon cable which can be damaged after the SIM card has been handled several times, and effectively leads to a drop in the level of quality of the NFC type functionalities due to a low level of quality for the transmission of the analogue signals.

Moreover, the antenna wires of the ribbon cable 21 are connected to the SIM card on two contacts C4 and C8 which therefore cannot be used for other possible connections.

SUMMARY

The present invention aims to improve this situation.

A first aspect of the present invention proposes an electronic entity adapted for a mobile terminal, said mobile terminal being able to comprise a subscriber identity card, said electronic entity comprising a near-field communication component, an antenna for the near-field communication component and a wired interface intended to link the near-field component to the subscriber identity card, the near-field communication component being positioned at the level of the antenna.

By the term 'positioned at the level of the antenna' is meant here the fact that the NFC component and the antenna are not remote, but on the contrary are positioned close to one another so that the analogue signals do not degrade between the antenna and the NFC component. In an embodiment, the NFC component can be incorporated directly into the antenna.

It can also be provided that wires with a relatively short length link the NFC component and its antenna. In this case, the length of these antenna wires is such that the transmission of the signals over these wires is not disrupted by the environment in the casing of the mobile terminal, such as metallic masses or electronic components in particular.

In an embodiment of the present invention, the antenna is an antenna adapted in order to be positioned in a mobile terminal casing and in order to be easily detachable. In this case, when the antenna is removed, the NFC component directly connected to it is also removed.

In such an electronic entity, it is therefore provided to install the NFC component, or near-field communication component, at the level of the antenna which is associated with it in order to carry out the communications that it manages. By thus colocating the near-field communication component and its antenna, it is possible to ensure a certain level of quality for the NFC type functionalities, whatever the type of mobile telephone in which this electronic entity is positioned and also whatever the path followed by the wired interface between the SIM card and the NFC component within the casing of the telephone.

An electronic entity is then obtained which offers a user of a mobile terminal both mobile telephone functionalities and contactless card functionalities, while making it possible to keep all of these functionalities and the user's data stored there and associated with it, even when the mobile telephone is changed. This electronic entity architecture moreover makes it possible to ensure a level of performance of the NFC component, since the performance is no longer affected here by the route of the wired interface, unlike in the case described above with reference to FIG. 1. Unlike in the prior art, here the signals being carried are digital signals, not analogue signals. In this case, even if certain items of information being carried are altered, the management protocol can make it possible to recover them.

Moreover, advantageously, the contacts of the SIM card, which are in general the contacts C4 and C8, previously used to connect, via a ribbon cable, the antenna to the NFC component in the SIM card, can be freed, since the NFC component is not implemented in the SIM card.

It can be provided to use the contact C6 of a SIM card to carry items of information according to the near-field communication management protocol.

In an embodiment of the present invention, there is a wired interface between the SIM card and the near-field communication component, since, unlike in an embodiment of the cited prior art, the NFC component is remote from the SIM card, i.e. it is not incorporated into the SIM card.

It is possible here to provide for a wired interface with a length adapted for each mobile terminal casing, but without disrupting the performance of the NFC applications, unlike in the prior art, in which the antenna wires were supported by the wired interface. As the signals are digital, the length of the wires here has no influence on the quality of the wired transmission.

An embodiment of the present invention can advantageously be applied to NFC components which consist of emulating a contactless card or also to components which consist of operating as a card reader.

In the case of card emulation, the electrical power supply of the NFC component can be provided via the antenna 13 of the NFC component by an NFC device with which the contactless card communicates, i.e. by the device that is operating as a contactless card reader. Here, the wired interface can only support a single connecting wire between the NFC component and the SIM card, this wire being the one that is adapted for carrying items of information according to a near-field communications management protocol.

In other cases, such as for example in the case where the NFC component of the electronic entity according to an embodiment of the present invention is an NFC component which operates as a card reader, the wired interface can comprise both an electrical power supply and a wire carrying items of information according to an NFC type communication management protocol.

The electrical power supply can advantageously be carried directly to the NFC component from the contacts at which the SIM card picks it up.

Thus, it is easy to implement both the mode of operation as a contactless card emulator and the mode of operation as a contactless card reader.

In an embodiment of the present invention, the wired interface is composed of a plastic film including at least one connecting wire and a contact associated with said connecting wire, said contact associated with said connecting wire being intended to be positioned at the level of a contact of the subscriber identity card, and the plastic film is pierced in several locations around said contact.

Thus, the wired interface between the NFC component and the SIM card includes one or more connecting wires, made of conductive material which can be copper, which make it possible to link the SIM card and the NFC component. The plastic film, or the plastic ribbon, therefore comprises a contact at the end of each connecting wire intended to be associated with a contact of the SIM card.

In order to make it possible to implement a more reliable connection, between a contact of the wired interface and a contact of the SIM card, it is advantageously provided here to perforate the plastic ribbon in the region of the contact of the connecting wire concerned. It is thus possible to create flexibility holes which, by making the thickness of the plastic film more flexible, make it possible to create a stable connection between the contacts of the wired interface and those of the SIM card.

More precisely, when it is necessary to create a connection between a contact of the wired interface and a contact of the SIM card, the two contacts are positioned one on top of the other. Then, when this electronic entity is positioned in a mobile terminal casing, a mechanical contact of the telephone rests on the two contacts positioned one on top of the other. The fact of creating flexibility holes around the contact of the wired interface allows the two contacts to make better contact with each other, even if the mechanical contact of the casing of the terminal does not exert a great pressure.

In an embodiment of the present invention, the contact associated with the connecting wire of the wired interface is positioned at the level of a contact of the subscriber identity card by bonding.

By proceeding in this manner, it is possible to ensure a reliable mechanical connection at the level of the contacts of the SIM card and of the contacts of the wired interface associated with the NFC component, even in the case where the mechanical contact of the mobile terminal does not exert a great pressure on its own. A layer of adhesive between a contact of the SIM card and a contact of the wired interface makes it possible to ensure a good hold between these two contacts.

It can be provided to use an adhesive that makes it possible to bond and/or rebond a contact of the wired interface on the SIM card.

In an embodiment of the present invention, the wired interface carries items of information according to a near-field communication management protocol.

The quality of such a wired interface is not sensitive to the path followed in the casing of the mobile terminal, unlike in the case of the prior art described above. Moreover, this wired interface makes it possible to carry items of information according to an NFC communication management protocol and thus to manage near-field communications for corresponding applications. The items of information carried can correspond to the exchanges of data between the NFC component and the SIM card required for the management of the NFC communications.

In certain NFC applications, the NFC component is supplied with electrical power, via its antenna, by an NFC device with which it is intended to communicate for the implementation of an NFC application. In other applications, the NFC component needs to be supplied with power directly.

To this end, such a wired interface can also comprise a link for carrying an electrical power supply. Thus, the wired interface can also carry an electrical power supply from the SIM card to the NFC component. In this case, the electrical power supply is picked up from the contacts of the SIM card which are adapted for receiving the electrical power supply, then it is carried via the wired interface to the NFC component.

Alternatively, it can be provided that the NFC component is connected directly onto the battery of the mobile terminal In this case, the wired interface is not needed for the electrical power supply of the NFC component. Moreover, it then suffices to change the battery in order to convert a conventional mobile terminal into an NFC mobile terminal according to an embodiment of the present invention.

In an embodiment of the present invention, the electrical power supply is carried to the near-field communication component via two connecting wires to which two contacts of the wired interface correspond respectively, each of said contacts of the wired interface allowing conduction from one face of the contact to another. In this case, it is provided to position the contacts of the wired interface, which are associated with the connecting wires intended to carry the electrical power supply between, on the one hand, the contacts of the mobile terminal that provide the electrical power supply and, on the other hand, the contacts of the SIM card that are intended to receive the electrical power supply. Thus, according to an embodiment of the present invention it is advisable to provide contacts of the wired interface that are conductive from one face of the contact to the other face. For these contacts, as it is advisable to provide that the electrical power supply passes through from the contacts of the mobile terminal to the contacts of the SIM card via the corresponding contacts of the wired interface, it is advantageous to provide a plastic ribbon that is quite flexible at the level of these contacts, i.e. to provide a plastic film pierced around the corresponding contacts of the wired interface.

The near-field communication management protocol can be an SWP ('Single Wire Protocol') type protocol.

In an embodiment, a near-field communication is managed according to a first frequency value,
said electronic entity also comprising a quartz clock providing a second frequency value greater than said first frequency value, and a frequency divider.

These features advantageously make it possible to provide a quartz clock which has a reduced size compared with a quartz clock which would be necessary to provide the lower frequency value required for the NFC type communications management. By using a frequency divider, it is therefore possible to reduce the size of the clock used and thus to easily introduce the electronic entity according to an embodiment of the present invention into the casing of a mobile terminal.

The first frequency value can be a value defined by an NFC standard. It can take for example a value of 13.56 MHz. In this case, it is possible to use a quartz clock with an approximate value of 27 Mhz.

A second aspect of the present invention proposes a mobile terminal adapted both for operating in a communication network and for managing near-field communications, which comprises an electronic entity according to the first aspect of the present invention.

The mobile terminal can comprise a subscriber identity card and comprises an electronic entity according to the first aspect of the present invention.

The electronic entity comprises a wired interface between the near-field communication component and the subscriber identity card. This wired interface is composed of a plastic film including at least one connecting wire and a contact associated with said connecting wire,
and the contact associated with the connecting wire is positioned between a contact of the subscriber identity card and a contact of the terminal,
the plastic film being pierced in several locations around said contact.

The holes in the plastic film around the contact of the wired interface make it possible to introduce a flexibility into the thickness of the plastic ribbon, and consequently make it possible to easily produce a mechanical connection between a contact of the terminal, a contact of the SIM card and a contact of the wired interface, even if the contact of the terminal does not exert a great pressure. These features are relevant in particular for ensuring conduction from the contact of the terminal to the contact of the SIM card, passing through the contact of the wired interface, the latter consequently ensuring a conductivity from one of its faces to the other face.

A third aspect of the present invention proposes a mobile communication system comprising a plurality of mobile terminals according to the second aspect of the present invention.

BRIEF DESCRIPTION OF THE DRAWINGS

Other aspects, purposes and advantages of the invention will become apparent on reading the description of one of its embodiments.

The invention will also be better understood with the help of the drawings, in which.

DETAILED DESCRIPTION

Figure 1:
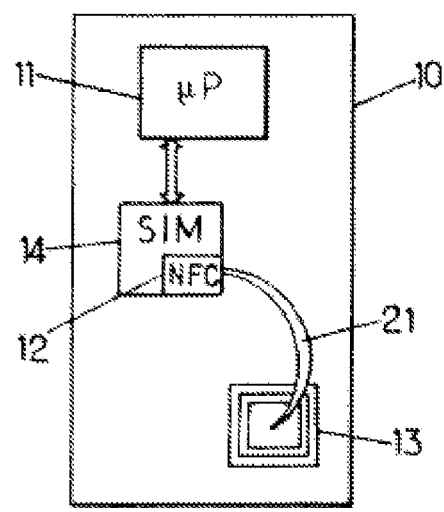
FIG. 1, already described above, shows an architecture of a mobile terminal according to the prior art.
Figure 2:
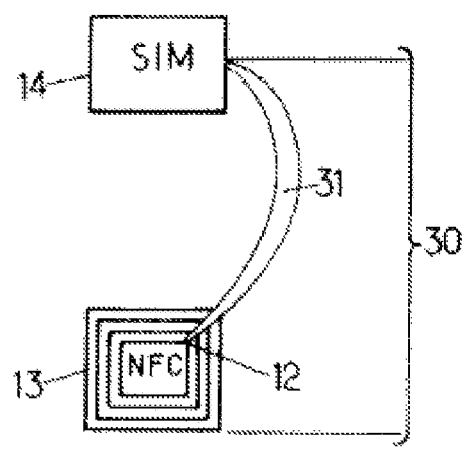
FIG. 2 shows an architecture of an electronic entity according to an embodiment of the present invention.

FIG. 2 shows an architecture of an electronic entity according to an embodiment of the present invention.

Such an electronic entity 30 is intended to be used in a mobile terminal such as for example a mobile telephone terminal, in order to offer mobile telephone type functionalities and contactless card type functionalities. To this end, the terminal therefore comprises a subscriber identity card 14, for example a SIM card, for the mobile telephone applications, and the electronic entity according to an embodiment of the present invention comprises a near-field communication component 12, i.e. an NFC component, an antenna 13 for this NFC component, as well as a wired interface intended to link the NFC component to the SIM card, from which it is remote.

In an embodiment of the present invention, the NFC component is positioned at the level of the antenna 13 and linked to the subscriber identity card 14 via a wired interface 31. The wired interface 31 comprises:
- a first connecting wire, which can be made of copper, intended to carry items of information according to a near-field communication management protocol; and
- second and third connecting wires which can be made of copper, intended to carry the electrical power supply.

More precisely, a mobile terminal has mechanical contacts which are adapted for exerting a pressure at the level of the contacts of the SIM card. Two of these contacts represent the electrical power supply respectively with a ground terminal GND and a power supply terminal VCC. It is provided to position, between the contacts of the mobile terminal GND and VCC and the corresponding contacts of the SIM card, contacts of the wired interface according to an embodiment of the present invention. These contacts of the wired interface have two faces supported on either side of the plastic film and are conductive from one face to the other.

Figure 3:
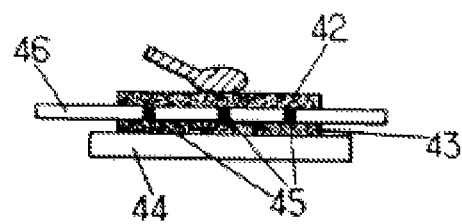
FIG. 3 shows, in detail, a connection between contacts at the level of the SIM card according to an embodiment of the present invention.

FIG. 3 shows, in detail, a connection between contacts at the level of the SIM card according to an embodiment of the present invention.

The wired interface 31, as illustrated in FIG. 2, is composed of a plastic film, which can be made of a Kapton type material, and which supports the connecting wires between the contacts of the SIM card and the contacts of the NFC component. Each of these connecting wires ends in a contact, such as the contact 42-43 shown in FIG. 3. This contact of the wired interface has a first face 42 and a second face 43 on either side of the wall of the plastic film 46. Each of the two faces of the contact of the wired interface is here conductive relative to the other, via metallized holes 45 positioned in the plastic film between the faces 42 and 43 for example.

The contact 42-43 of the wired interface is intended to be connected to a contact 44 of the SIM card. To this end, the contact 42-43 of the wired interface is positioned on the contact 44 of the SIM card, a mechanical contact 41 of the mobile terminal exerting a mechanical pressure on these contacts 42-43 and 44.

In order to ensure a better hold between the contacts 42-43 and 44, whatever the pressure exerted by the contact 41 of the mobile terminal, it can be provided to affix a layer of adhesive between the surface of the face 43 outside the plastic film and the surface of the contact 44 outside the SIM card.

Figure 4:
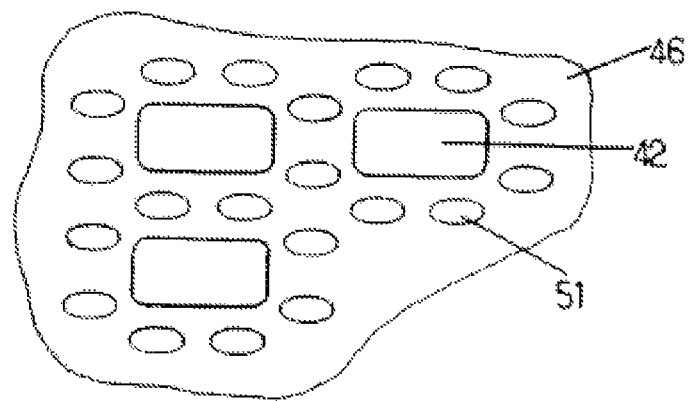
FIG. 4 shows an area of the wired interface according to an embodiment of the present invention.

FIG. 4 shows an area of the wired interface according to an embodiment of the present invention. The area illustrated here corresponds to the area of contacts to be linked to the contacts of the SIM card in order to connect, according to an embodiment of the present invention, the contacts of the NFC component to the contacts of the SIM card, which is remote from this NFC component. Thus, the plastic film 46 supports contacts 42 of the wired interface, these contacts are suspended within the plastic film. Close to each contact 42, it is advantageously possible to provide flexibility holes 51 in the plastic film. These holes 51 make it possible to improve the flexibility of the thickness of the plastic film and thus make it possible to improve the reliability of a connection such as described with reference to FIG. 3.

Figure 5:
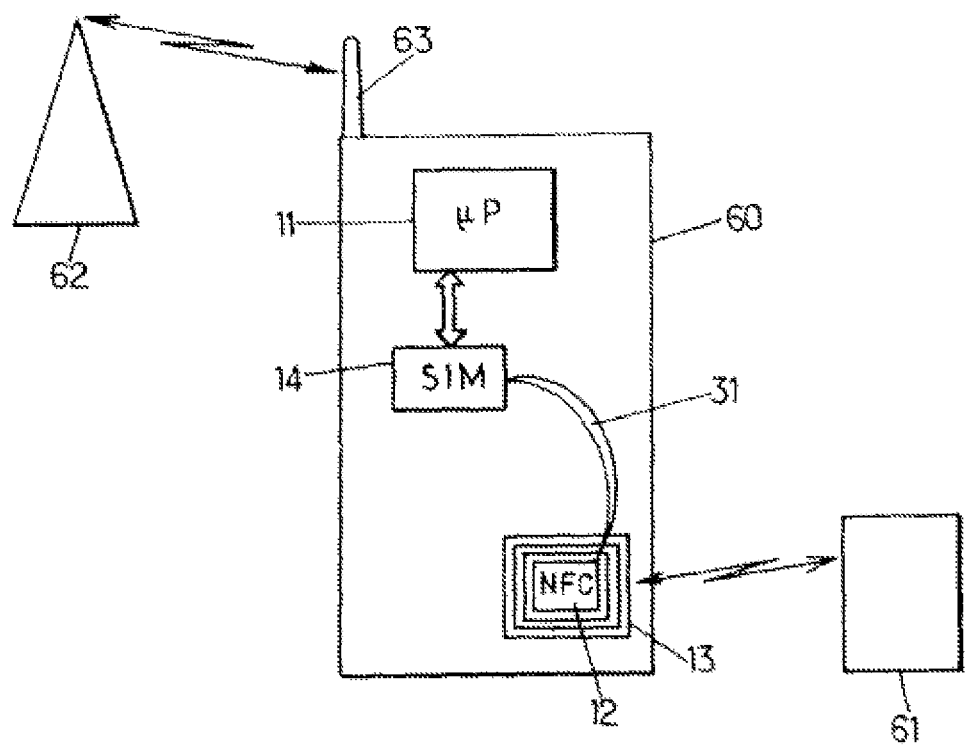
FIG. 5 shows a mobile telephone system according to an embodiment of the present invention.

FIG. 5 shows a mobile telephone system according to an embodiment of the present invention.

Such a system comprises a plurality of terminals 60, each being adapted, according to an embodiment of the present invention, on the one hand, for managing mobile telephone communications and, on the other hand, for managing NFC type communications.

To this end, the system comprises devices of mobile telephone networks, such as base stations 62, with which the terminals 60 can communicate via an antenna 63 of the mobile telephone. It also comprises an NFC device 61 for NFC applications with which the mobile telephones 60 can communicate via the antenna 13. These two antennas 63 and 13 are adapted for implementing mobile telephone applications and NFC applications respectively.

The invention claimed is:

1. An electronic entity adapted for a mobile terminal, said mobile terminal being able to comprise a subscriber identity card, said electronic entity comprising a near-field communication component, an antenna for the near-field communication component and a wired interface that links the near-field communication component to the subscriber identity card, the near-field communication component being positioned at a level of the antenna, and wherein the wired interface is composed of a plastic film including at least one connecting wire and a contact associated with said connecting wire, said contact associated with the connecting wire positionable at a level of a contact of the subscriber identity card, and wherein the plastic film is pierced in several locations around said contact.

2. The electronic entity according to claim 1, wherein the contact associated with the connecting wire of the wired interface is positioned at the level of a contact of the subscriber identity card by bonding.

3. The electronic entity according to claim 1, wherein the wired interface carries items of information according to a near-field communication management protocol.

4. The electronic entity according to claim 3, wherein the wired interface also carries an electrical power supply.

5. The electronic entity according to claim 4, wherein the electrical power supply is carried to the near-field communication component through the wired interface via two connecting wires to which two contacts of the wired interface correspond respectively, each of said contacts of the wired interface allowing conduction from one face of the contact to another face.

6. The electronic entity according to claim 3, wherein the near-field communication management protocol is an SWP ('Single Wire Protocol') type protocol.

7. The electronic entity according to claim 1, wherein a near-field communication is managed according to a first frequency value, said electronic entity also comprising a quartz clock providing a second frequency value greater than said first frequency value, and a frequency divider.

8. A mobile terminal adapted both for operating in a communication network and for managing near-field communications, able to comprise a subscriber identity card and comprising an electronic entity including a near-field communication component, an antenna for the near-field communication component and a wired interface that links the near-field communication component to the subscriber identity card,
the near-field communication component being positioned at a level of the antenna, and wherein the wired interface is composed of a plastic film including at least one connecting wire and a contact associated with said connecting wire, and wherein the contact associated with the connecting wire is positioned between a contact of the subscriber identity card and a contact of the terminal, the plastic film being pierced in several locations around said contact.

9. A mobile communication system comprising a plurality of mobile terminals according to claim 8.

\* \* \* \* \*